(12) United States Patent
Im et al.

(10) Patent No.: US 7,824,771 B2
(45) Date of Patent: Nov. 2, 2010

(54) CARBON-METAL COMPOSITE MATERIAL AND PROCESS OF PREPARING THE SAME

(75) Inventors: Dong-min Im, Seoul (KR); Han-su Kim, Seoul (KR); Yong-nam Ham, Ansan-si (KR); Jeong-hee Lee, Seongnam-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 680 days.

(21) Appl. No.: 11/338,106

(22) Filed: Jan. 23, 2006

(65) Prior Publication Data

US 2006/0165995 A1      Jul. 27, 2006

(30) Foreign Application Priority Data

Jan. 21, 2005   (KR) .................. 10-2005-0005808
Oct. 19, 2005   (KR) .................. 10-2005-0098664

(51) Int. Cl.
| | |
|---|---|
| B32B 9/00 | (2006.01) |
| B32B 3/26 | (2006.01) |
| B32B 3/06 | (2006.01) |
| B32B 15/00 | (2006.01) |
| B05D 3/02 | (2006.01) |
| B05D 1/18 | (2006.01) |
| B01J 23/40 | (2006.01) |

(52) U.S. Cl. .............. 428/408; 428/143; 428/304.4; 428/306.6; 428/312.2; 428/367; 428/389; 428/689; 427/314; 427/383.1; 427/431; 502/185

(58) Field of Classification Search ............. None
See application file for complete search history.

(56) References Cited

U.S. PATENT DOCUMENTS

| 4,263,376 A | 4/1981 | Blurton |
| 5,783,139 A | 7/1998 | Curran |
| 6,649,265 B1 | 11/2003 | Kawamura et al. |
| 6,780,350 B1 | 8/2004 | Kodas et al. |

FOREIGN PATENT DOCUMENTS

| EP | 0 355 853 | 2/1990 |
| EP | 0 450 849 | 10/1991 |

(Continued)

OTHER PUBLICATIONS

Janiak, Christoph, *Engineering coordination polymers towards applications*, Dalton Trans., 2003, pp. 2781-2804.

(Continued)

*Primary Examiner*—Melvin C Mayes
*Assistant Examiner*—Sarah Van Oudenaren
(74) *Attorney, Agent, or Firm*—Christie, Parker & Hale, LLP

(57) ABSTRACT

A carbon-metal composite material which has improved conductivity, specific surface area, regularity, a shape which is easily controlled, and a process of preparing the same. The carbon-metal composite material which includes carbon and metal, has a sheet resistance of 8 mΩ/sq. or less under a pressure of 100 kg/cm$^2$, a specific surface area of 30 m$^2$/g or greater, and shows an X-ray pattern having at least one peak at d-spacings of 6 nm or greater.

21 Claims, 14 Drawing Sheets

FOREIGN PATENT DOCUMENTS

| JP | 62-253742 | 11/1987 |
|---|---|---|
| JP | 1-252514 | 10/1989 |
| JP | 02-006313 | 1/1990 |
| JP | 09-208207 | 8/1997 |
| JP | 11-260369 | 9/1999 |
| JP | 2004-142955 | 5/2004 |

OTHER PUBLICATIONS

James, Stuart L., *Metal-organic frameworks*, Chem. Soc. Rev., 2003, vol. 32, pp. 276-288.

H. Yasuda et al; "New Carbon Composites Containing Ultrafine Fe, Co, or Ni Particles. 1. Facile Synthesis by Pyrolysis of Organometallic Polymers"; Journal of Inorganic and Organometallic Polymers, vol. 1, No. 1, 1991, pp. 135-141.

European Search Report, dated Apr. 19, 2006, for application No. 06250317.2, in the name of Samsung SDI Co., Ltd.

Patent Abstracts of Japan for Publication No. 01252514, Publication date Oct. 9, 1989, in the name of Hajime Yasuda.

Patent Abstracts of Japan for Publication No. 11260369; Publication date Sep. 24, 1999, in the name of Tetsuo Nishiwaki.

Chinese Office action dated Jan. 4, 2008, for Chinese application 2006100060031, with English translation indicating relevance of references filed Jan. 23, 2006 and May 11, 2006.

Janiak, Christoph, *Dalton Trans.*, 2003, p. 2781-2804 (on Order).

James, Stuart L., *Chem. Soc. Rev.*, 2003, 32, 276-288 (on Order).

Japanese Office action dated Dec. 18, 2009, for corresponding Japanese application 2006-021609, noting listed references in this IDS, as well as JP 1-252514 and JP 11-260369, both previously filed in an IDS dated May 11, 2006.

SIPO Office action dated Feb. 5, 2010, for corresponding Chinese application 200610006003.1, with English translation.

Japanese Office action dated Apr. 23, 2010, for corresponding Japanese Patent application 2006-012609 with English translation.

CARBON-METAL COMPOSITE MATERIAL AND PROCESS OF PREPARING THE SAME

CROSS-REFERENCE TO RELATED PATENT APPLICATION

This application claims priority to and the benefit of Korean Patent Application Nos. 10-2005-0005808, filed on Jan. 21, 2005 and 10-2005-0098664 filed on Oct. 19, 2005, in the Korean Intellectual Property Office, the disclosures of which are incorporated herein in their entirety by reference.

BACKGROUND OF THE INVENTION

1. Field of the Invention

The present invention relates to a carbon-metal composite material and a process of preparing the same, and to a carbon-metal composite material which has improved conductivity, specific surface area, and regularity and has a shape which is easily-controlled, and a process of preparing the same.

2. Description of the Related Art

Conventional conductive carbon materials have been generally used to reduce the internal resistances of various energy storage devices, thereby improving energy efficiency. For example, they can be used as a conducting material or an active material in batteries, the support of a catalyst for fuel cells, and an electrode material for supercapacitors.

Studies for enhancing the physical properties and improving the conductivity of conductive carbon materials have been conducted. However, none has achieved the combination of improved conductivity, specific surface area, uniformity, with a shape that is easily controlled.

SUMMARY OF THE INVENTION

In one embodiment, the invention provides a carbon-metal composite material which has improved conductivity, specific surface area, uniformity and has a shape that is easily controlled.

In another embodiment, the invention provides a process of preparing a carbon-metal composite material.

In yet another embodiment, the invention also provides a catalyst using the carbon-metal composite material.

In a further embodiment, the invention also provides a fuel cell including the catalyst.

In one embodiment of the invention, a carbon-metal composite material including carbon and metal is provided which has a sheet resistance of 8 mΩ/sq. or less under a pressure of 100 kg$_f$/cm$^2$ In an embodiment of the invention, the carbon-metal composite material has a specific surface area of 30 m$^2$/g or greater.

In another embodiment of the invention, the carbon-metal composite material has an X-ray diffraction pattern with at least one peak at a d-spacing of 6 nm or greater.

According to a further embodiment of the invention, a method of preparing the carbon-metal composite material is provided, including performing heat treatment on a powder including a coordination polymer.

In an embodiment, the coordination polymer may be a compound having a unit structure of formula (1):

$$M_xL_yS_z \quad (1)$$

where M is at least one metal selected from the group consisting of transition metals, group 13, group 14, group 15, lanthanides and actinides; L is a multi-dentate ligand simultaneously forming an ionic bond or a covalent bond with at least two metal ions; S is a monodentate ligand forming an ionic bond or a covalent bond with one metal ion; and when the number of functional groups of L that can bind to the metal ion is d, x, y and z are integers satisfying yd+z≦6x, x≧1, y≧1, and y+z≧1.

According to another embodiment of the invention, a catalyst is provided which includes the carbon-metal composite material as a support.

According to a further embodiment of the invention, a fuel cell including the catalyst is provided.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

Figure 1:
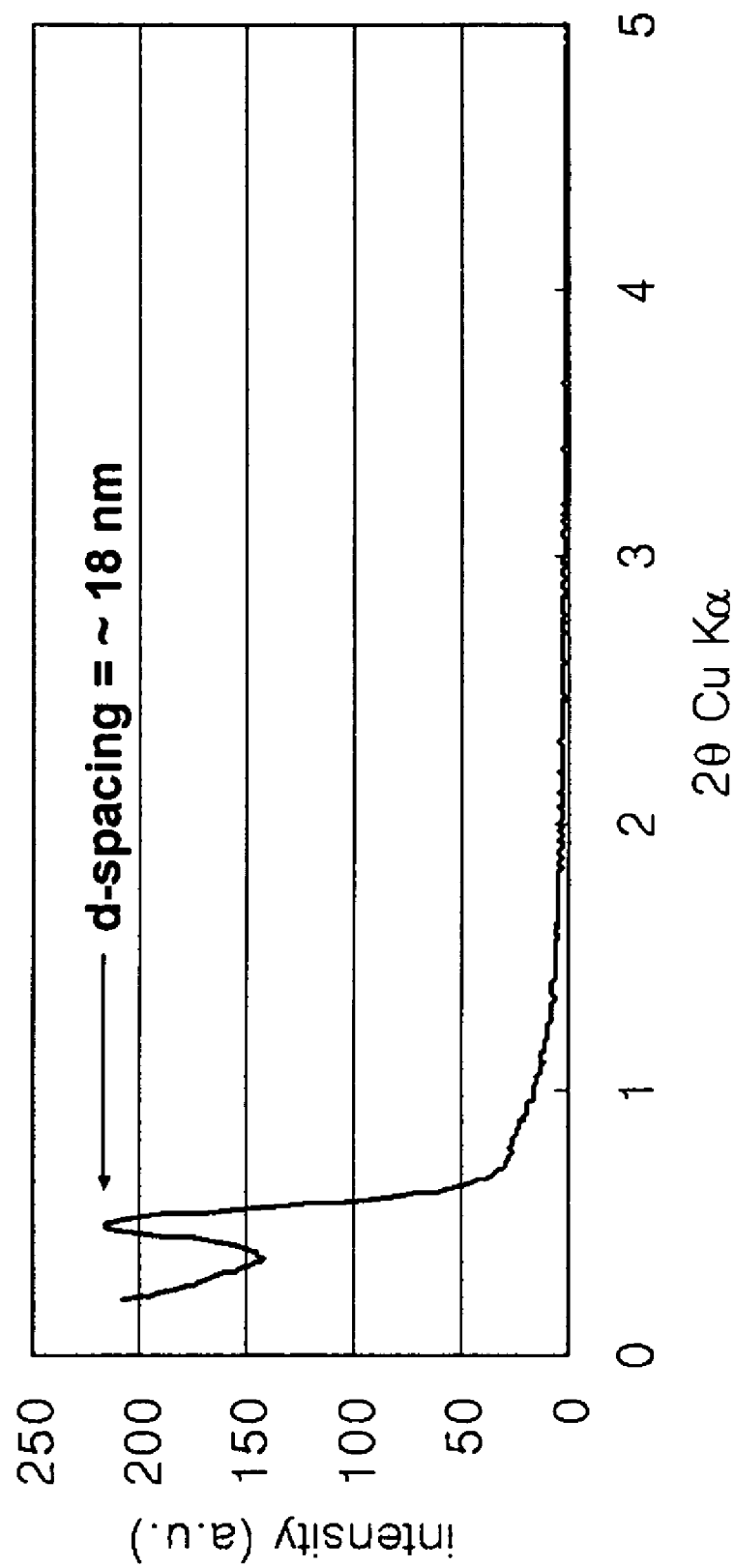
FIG. 1 is a graph illustrating an X-ray diffraction pattern of a carbon-nickel composite material prepared in Example 1 of the invention.

A carbon-metal composite material according to an embodiment of the invention has a sheet resistance of 0.5-8 mΩ/sq. under a pressure of 100 kg$_f$/cm$^2$ and a specific surface area of 30 m$^2$/g or greater which is measured using a BET method, and produces an X-ray diffraction pattern having at least one peak at a d-spacing of 6 nm or greater.

In an embodiment, the carbon-metal composite material can be prepared by performing a heat treatment on a powder including a coordination polymer, where the carbon-metal composite material has a highly regular structure, superior electrical conductivity, and a high specific surface area since the coordination compound has a network structure in which metals interconnect through multi-dentate ligands.

In one embodiment, the coordination polymer provides a new approach to the synthesis of composite materials and has a repeating unit having one-, two-, and three-dimensional morphologies compared to a general coordination compound of formula (2):

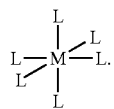
(2)

An example of the two-dimensional coordination polymer according to an embodiment is a compound of formula (3):

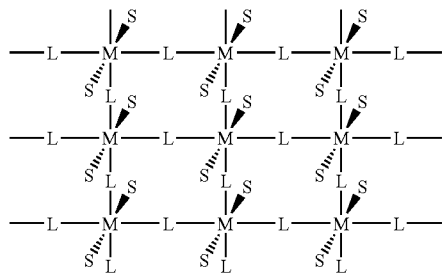
(3)

where M, L and S are as defined below.

In and embodiment, the two-dimensional coordination polymer of formula (3), four ligands (L) having multiple functional groups (hereinafter, multi-dentate ligands) and two monodentate ligands (S) coordinate to an metal (M) atom. The multi-dentate ligands (L) also coordinate to other adjacent metal (M) atoms. In this case, the metal (M) atom of the coordination polymer of formula (3) provides ligands with coordination sites in the same manner as in the coordination compound of formula (2), but ligands of the coordination polymer of formula (3) coordinate to multiple metal atoms at the same time. Multi-dentate ligands in which one ligand coordinates to two metals at the same time in formula (3) form a coordination polymer having a very regular lattice structure as a whole. Such a structure can be extended to a three-dimensional structure. This is because, unlike in a planar-type coordination polymer, the multi-dentate ligands on formula (3) can further coordinate to metal atoms or ligands located above or below them to form a three-dimensional coordination polymer.

According to an embodiment, the coordination polymer used to form the carbon-metal composite material may be a compound of formula (1):

(1)

where M is at least one metal selected from the group consisting of transition metals, group 13, group 14, group 15, lanthanides and actinides; L is a multi-dentate ligand simultaneously forming an ionic bond or a covalent bond with at least two metal ions; S is a monodentate ligand forming an ionic bond or a covalent bond with one metal ion; and when the number of functional groups of L that can bind to the metal ion is d, x, y and z are integers satisfying $yd+z \leqq 6x$, $x \geqq 1$, $y \geqq 1$, and $y+z \geqq 1$.

In the coordination polymer of formula (1), a multi-dentate ligand L links metal atoms or ions to form a network structure. Thus, the compound of formula (1) is primarily in a crystalline form. Such a coordination polymer may optionally include a monodentate ligand S which can bind to a metal atom or ion irrespective of the multi-dentate ligand L.

The structure of the coordination compound of an embodiment is different from that of a chelate compound. A chelate compound is a general compound in which a multi-dentate ligand binds to a metal ion, and has a different structure from the coordination compound of the present embodiment. That is, in the case of the chelate compound in which, for example, a multi-dentate ligand such as ethylene diamine coordinates to a metal ion, the network structure is not formed as in the coordination polymer of an embodiment of the invention, but a single coordination compound in which the multi-dentate ligand forms a chelate ring is obtained. In the coordination polymer of one embodiment of the invention, neighboring metals are essentially linked to each other through multi-dentate ligands to form a network structure, whereas in the chelate compound, multi-dentate ligands coordinate to only one metal ion at multiple sites, and thus, do not form a network structure.

When the network structure is formed through multi-dentate ligands L, core metal ions or atoms need not form coordination bonds only with multi-dentate ligands and, if necessary, may bind to monodentate ligands. That is, according to an embodiment, multi-dentate ligands L are necessary, but monodentate ligands S are further included if it is desired. In one embodiment, the monodentate ligand S may be any ligand used in general coordination compounds, for example, ligands containing N, O, S, P, As, etc. having lone pair electrons. For example, $H_2O$, $SCN^-$, $CN^-$, $Cl^-$, $Br^-$, $NH_3$ and the like can be used as the monodentate ligand. However, the monodentate ligand can also have multiple functional groups. In addition, when a chelate ring is formed, a multi-dentate ligand can be used. That is, according to an embodiment, although multi-dentate ligands such as bidentate ligands, tridentate ligands, tetradentate ligands, etc. are used, if metal atoms or ions can form a network structure through monodentate ligands, monodentate ligands can also be used.

In one embodiment, the multi-dentate ligand capable of linking metal ions or atoms to form a network may be any ligand having at least two functional groups capable of forming a covalent bond or ionic bond with the core metal to form a network structure. In particular, the multi-dentate ligand of an embodiment must be distinguished from the multi-dentate ligand coordinating to only one metal ion to form a chelate ring (chelate ligand) as described above. This is because it is difficult to form a coordination polymer having a network structure with a chelate ligand.

According to an embodiment of the invention, examples of the multi-dentate ligand include trimesate-based ligands of formula (4), terephthalate-based ligands of formula (5), 4,4'-bipyridine-based ligand of formula (6), 2,6-naphthalenedicarboxylate-based ligands of formula (7) and pyrazine-based ligands of formula (8):

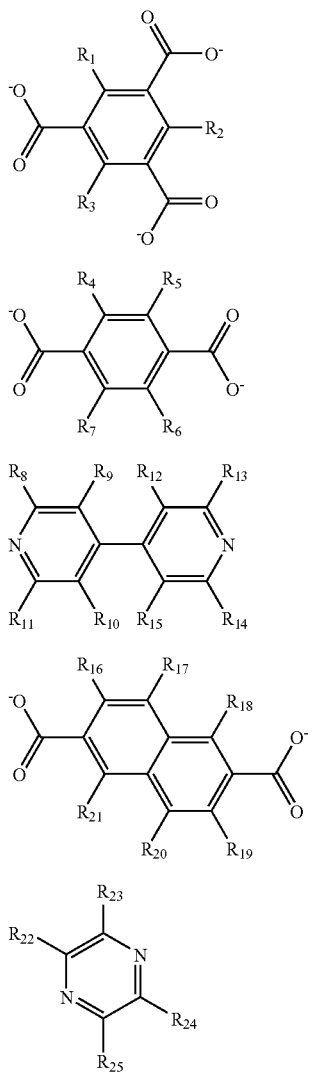

(4)

(5)

(6)

(7)

(8)

where $R_1$ to $R_{25}$ are each independently a hydrogen atom, a halogen atom, a hydroxy group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{6-30}$ aryl group, a substituted or unsubstituted $C_{6-30}$ aryloxy group, a substituted or unsubstituted $C_{2-30}$ heteroaryl group or a substituted or unsubstituted $C_{2-30}$ heteroaryloxy group.

The multi-dentate ligands are described in more detail in Chistoph Janiak, *Dalton Trans.*, 2003, p 2781-2804, and Stuart L. James, *Chem. Soc. Rev.*, 2003, 32, 276-288, the disclosures of which are incorporated herein by reference.

Figure 14:
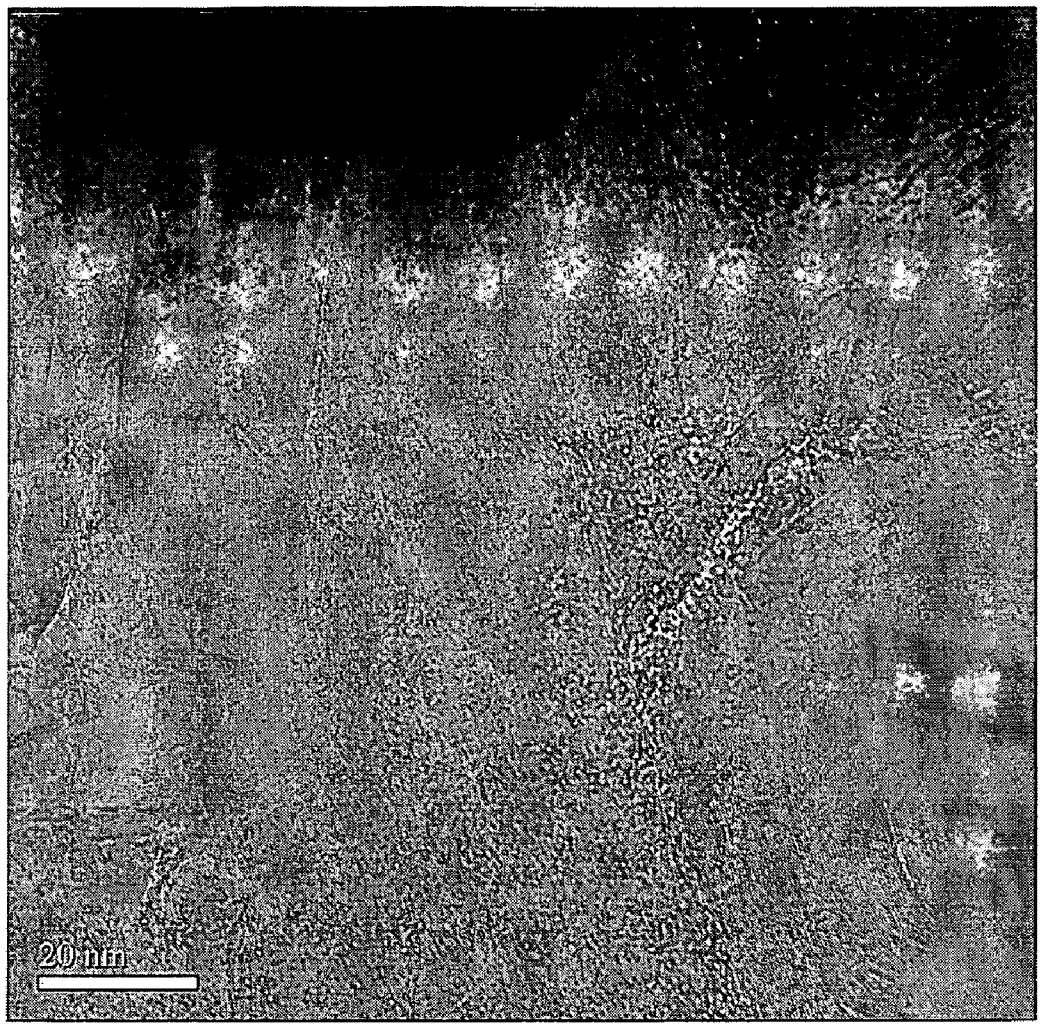
FIG. 14 is a magnified TEM image of the carbon-nickel composite material prepared in Example 1.

The metal bound to the multi-dentate ligands to form the coordination polymer is not limited as long as it can provide the multi-dentate ligands with coordination sites. In an embodiment, examples of such metals include transition metals, group 13, group 14, group 15, lanthanides and actinides. In one embodiment, for example, Fe, Pt, Co, Cd, Cu, Ti, V, Cr, Mn, Ni, Ag, Au, Pd, Ru, Os, Mo, Zr, Nb, La, In, Sn, Pb, Bi, etc. can be used. In another embodiment, among these, at least one metal selected from the group consisting of Ag, Cu, Pd, Pt, Au, Ru, Os, and combinations thereof, has a high reduction potential as illustrated in FIG. 14, and thus, can minimize adverse effects such as dissolution etc. when a composite material including them is used as an electrode in a fuel cell, etc.

Regarding the coordination number, in formula (1), in an embodiment, x, y and z are integers satisfying yd+z≦6x, x≧1, y≧1, and y+z≧1, where d denotes the number of functional groups of the multi-dentate ligand L which can bind to the metal. For example, when L is a tetradentate ligand and two monodentate ligands S coordinate to a metal, the coordination polymer has a basic structure of $MLS_2$ and satisfies the equation 1 (y)×4(d)+2(z)=6×1(x). Since the multi-dentate ligand L is essential to form a network, y is at least 1. Also, since the monodentate ligand S is an optional element, z is at least 0. It will be understood by those skilled in the art that x, y and z do not represent the specific number of atoms but they indicate ratios of metals and ligands in view of the nature of the polymer. When the core metal M is Cd and the multi-dentate ligand L is 4,4'-bipyridine, the coordination polymer of one embodiment is a compound of formula (9):

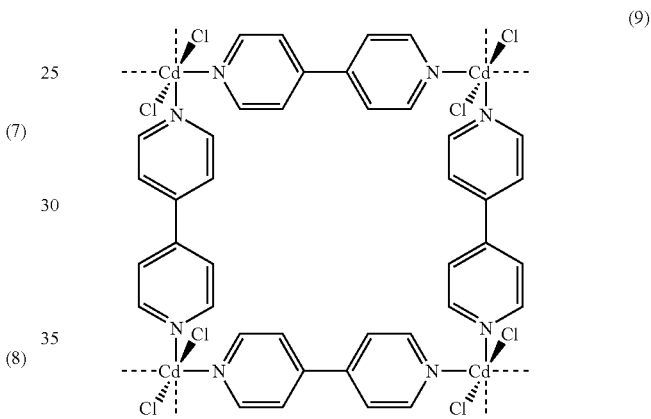

(9)

where each of x and y is 1 and z is 2.

In the coordination polymer of formula (9), 4,4'-bipyridine coordinates to Cd, the core metal. Specifically, a terminal nitrogen atom of 4,4'-bipyridine binds to a Cd ion and another terminal nitrogen atom of 4,4'-bipyridine binds to another Cd ion. This binding pattern is repeated to form network, thereby obtaining a coordination polymer having a two-dimensional lattice structure. Such coordination polymer structures affect the final shape, for example, periodicity, etc. of carbon-metal composite materials finally obtained by performing a heat treatment on the coordination polymer. Thus, when the process of forming the coordination polymer is properly controlled, the shape of the final product can be controlled. The crystalline shape of the coordination polymer can be controlled by properly modifying the reaction temperature, pH, reaction time when a metal precursor and ligands bind to each other, the type of metal, the type of ligand and concentrations thereof, or by properly controlling drying temperature and time.

As described above, a carbon-metal composite material according to an embodiment of the invention is obtained by performing a heat treatment on a powder including the coordination polymer. In one embodiment, the heat treatment may be carried out under an inert atmosphere at a temperature between 600° C. and the melting point of metal, preferably at a temperature between 600° C. and 1000° C., for about 0.1-10 hours, preferably, 0.5-3 hours. When the heat treatment temperature is lower than 600° C., hydrogen in the carbon is not completely removed and resistance increases, resulting in a reduction in electrical conductivity. When the heat treatment temperature is higher than the melting point of the metal, metal is melted, which makes it difficult to form a uniform composite material. When the heat treatment time is less than 0.1 hours, the effect of the heat treatment is not sufficient. When the heat treatment time is greater than 10 hours, the heat treatment has no effect, in spite of extended heat treatment time, and thus it is not economical.

When the coordination polymer is subjected to the heat treatment as described above, all volatiles and combustible parts are vaporized and removed. Thus, a carbon-metal composite material having an unchanged shape and a reduced volume may be obtained. Since the shape of the coordination polymer is maintained even after the heat treatment, the crystal shape of the final product can be easily controlled, as indicated above.

After heat treatment, the surface of the coordination polymer crystal can get rough. This is because volatile and combustible portions are evaporated and removed, and metal components are agglomerated on the surface. This significantly improves the specific surface area. The improved specific surface area enhances the utility of the carbon-metal composite material as a support for a catalyst used in fuel cells, etc.

In an embodiment, the structure of the carbon-metal composite material has a constant periodicity. The periodicity is attributed to the one-, two-, and three-dimensional repeating structures of the coordination polymer, which indicates that the regularity of the coordination polymer is maintained even after the heat treatment. The periodicity can be measured through X-ray diffraction analysis. The carbon-metal composite material of an embodiment has peaks at d-spacings of 6 nm or greater, indicating periodicity. In one embodiment, the d-spacings are 6 nm or greater, preferably 10-100 nm. The periodicity is an important factor determining the physical properties of the carbon-metal composite material. In another embodiment, the metal portion and the carbon portion of the coordination polymer are uniformly arranged at the molecular level, and thus a compact composite material containing nanometallic particles which have an average particle diameter of 1 μm or less can be obtained. The periodic arrangement having a period of 6 nm or greater is not obtained by using only a structure directing agent. In an embodiment, the carbon-metal composite material obtained by performing a heat treatment on a powder including the coordination polymer, shows a d-spacing of 6 nm or greater in an X-ray diffraction pattern.

The carbon-metal composite material of one embodiment has improved specific surface area due to modification of the surface of the coordination polymer particles by means of heat treatment. While the surface of the coordination polymer is smooth before heat treatment (see FIG. 9), it is significantly rough after heat treatment (see FIG. 11). This is because most of organics other than carbon are removed, and metals are agglomerated on the surface, thereby increasing the specific surface area. As a result, in one embodiment, the carbon-metal composite material has a specific surface area of about 30 $m^2/g$ or greater, preferably 50-500 $m^2/g$, which is measured using a BET method. The improved specific surface area enhances the utility of the carbon-metal composite material as a support for a catalyst, etc. In particular, when the carbon-metal composite material has superior electrical conductivity and high specific surface area, its utility is further increased.

The carbon-metal composite material of an embodiment has better conductivity than conventional carbon materials since the carbon part and the metal part are periodic and disposed compactly. In one embodiment, the carbon-metal composite material has a sheet resistance of 8 mΩ/sq. or less, preferably 0.01-5 mΩ/sq. under a pressure of 100 $kg_f/cm^2$. The sheet resistance can be measured using a 4-probe method while pressurizing 0.1 g of a carbon-metal composite material powder in a disc-shaped mold having a diameter of 13 mm. Such low resistance is achieved since the carbon-metal composite material contains both carbon and metal in one molecule, and the carbon and metal are periodic and disposed compactly. This structure cannot be achieved with conventional carbon materials.

In an embodiment, the carbon-metal composite material may have various shapes such as particles and rods. Thus, it is difficult to accurately measure the particle size of the carbon-metal composite material, but it can be seen from an SEM image etc. that the carbon-metal composite material comprises nano-sized particles. In one embodiment, the average particle diameter of the carbon-metal composite material may be 0.1-1 μm.

The carbon-metal composite material is advantageous in that most of the coordination polymers used as raw materials can be synthesized in an aqueous solution, thereby reducing costs and increasing safety. Additionally, a desired product can be obtained by only using heat treatment, which makes mass-production easy and a template unnecessary. In an embodiment, the coordination polymers used as raw materials are obtained by coordinating ligands, for example, in an acid form, to metals which are generally present in a salt form. The resulting product includes a mixture of the coordination polymers and unreacted materials. In this case, only the coordination polymers can be isolated and used as a concentrate, but the mixture can be filtered, dried, and heat-treated without an isolation process to cost-effectively provide the carbon-metal composite material. In an embodiment, the coordination polymer is in a powder form before heat treatment, and the powder may further include organic compounds which are unreacted ligands, in addition to the coordination polymer crystals. The content of the unreacted organic compounds can be varied by properly adjusting reaction conditions. Thus, physical properties of the resulting carbon-metal composite material may be partially varied.

In an embodiment, a carbon-metal composite material having various shapes can be obtained by controlling the shape of the coordination polymer, and thus the shape of particles can be easily controlled according to the desired use thereof. In one embodiment, since the carbon part and the metal part are periodic and compactly disposed, the carbon-metal composite material has very high conductivity, and thus can be used as an active material for cells, catalysts, supports for catalysts, hydrogen reservoirs, conducting agents, magnetic substances, luminous substances, nonlinear optical materials, etc.

In an embodiment, the carbon-metal composite material has improved conductivity and specific surface area in addition to high regularity, and thus is useful as a support for catalysts used in fuel cells, etc.

Figure 20:
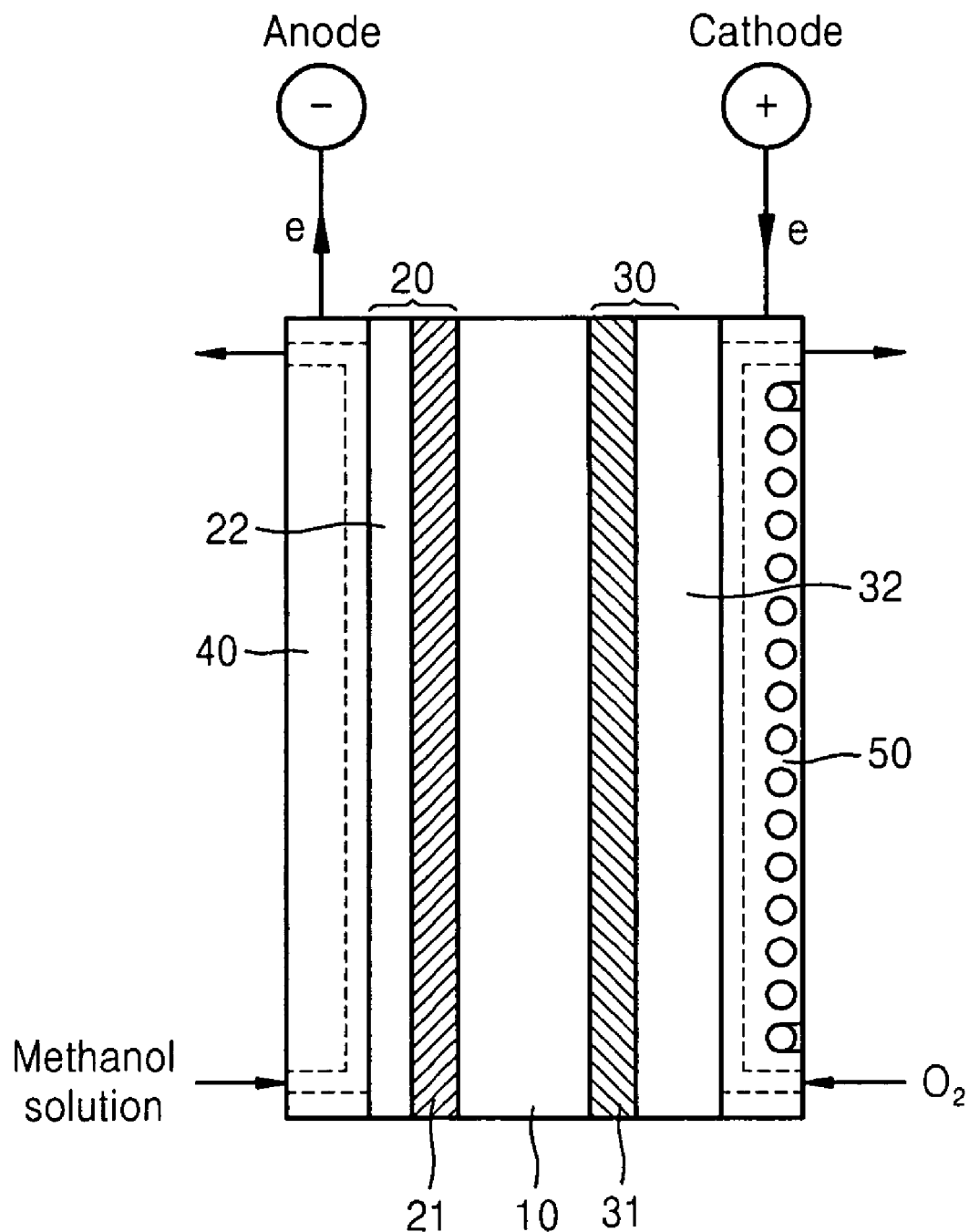
FIG. 20 is a schematic view of a fuel cell.

FIG. 20 illustrates the general structure of a direct methanol fuel cell (DMFC) which is one type of fuel cell. Referring to FIG. 20, the DMFC includes an anode 20 to which a fuel is supplied, a cathode 30 to which an oxidant is supplied, and an electrolyte membrane 10 interposed between the anode 20 and the cathode 30. Generally, the anode 20 consists of an anode diffusion layer 22 and an anode catalytic layer 21 and the cathode 30 consists of a cathode diffusion layer 32 and a cathode catalytic layer 31. A separator 40 includes a flow path for supplying a fuel to the anode 20 and acts as an electron conductor for transferring electrons from the anode 20 to an outer circuit or an adjacent unit cell. A separator 50 includes a flow path for supplying an oxidant to the cathode 30 and acts as an electron conductor for transferring electrons from an outer circuit or an adjacent unit cell to the cathode 30. In the DMFC, an aqueous methanol solution is generally used as the fuel cell supplied to the anode 20 and air is generally used as the oxidant supplied to the cathode 30. The aqueous methanol solution is transferred to the anode catalytic layer 21 through the anode diffusion layer 22 and is decomposed to produce electrons, hydrogen ions, carbon dioxide, etc. Hydrogen ions are transferred to the cathode catalytic layer 31 through the electrolyte membrane 10, electrons are transferred to an outer circuit, and carbon dioxide is discharged. In the cathode catalytic layer 31, hydrogen ions transferred through the electrolyte membrane 10, electrons supplied from the outer circuit, and oxygen in air supplied through the cathode diffusion layer 32 react with one another to produce water.

In such fuel cell systems according to an embodiment of the invention, the catalytic layer is very important and preferably has a high specific surface area in terms of efficiency. The carbon-metal composite material according to one embodiment has superior electrical conductivity and improved specific surface area compared to conventional support materials, and thus, is particularly useful as a support for catalysts in fuel cell systems.

The invention will now be described in greater detail with reference to the following examples. The following examples are for illustrative purposes only and are not intended to limit the scope of the invention.

Example 1

3.8 g of nickel (II) acetate tetrahydrate and 2.0 g of trimesic acid were added to 100 mL of distilled water and stirred at 55° C. for 2 hours. Powders produced in the solution were separated using a nylon filter, washed with distilled water several times, and then dried in an oven at 100° C. for 2 hours to obtain a crystalline coordination polymer.

The obtained crystalline coordination polymer was subjected to a heat treatment under an Ar atmosphere at 900° C. for 1 hour to prepare a carbon-nickel composite material which had the same shape as the untreated crystalline coordination polymer and reduced volume.

The carbon-nickel composite material was measured using an X-ray diffraction method. As a result, it was determined that the size of the nickel metal particles was 18.3 nm. Referring to FIG. 1, a periodicity of 18 nm could be observed when a low angle X-ray diffraction experiment was performed.

Figure 2:
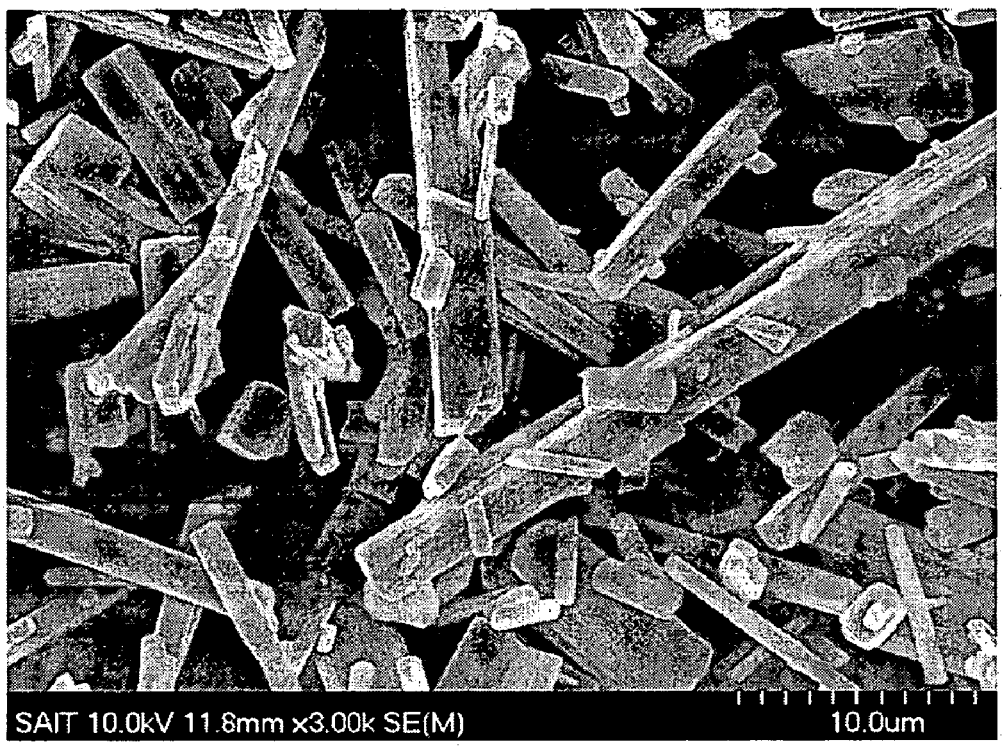
FIG. 2 is an SEM image of a coordination polymer prepared in Example 1.
Figure 3:
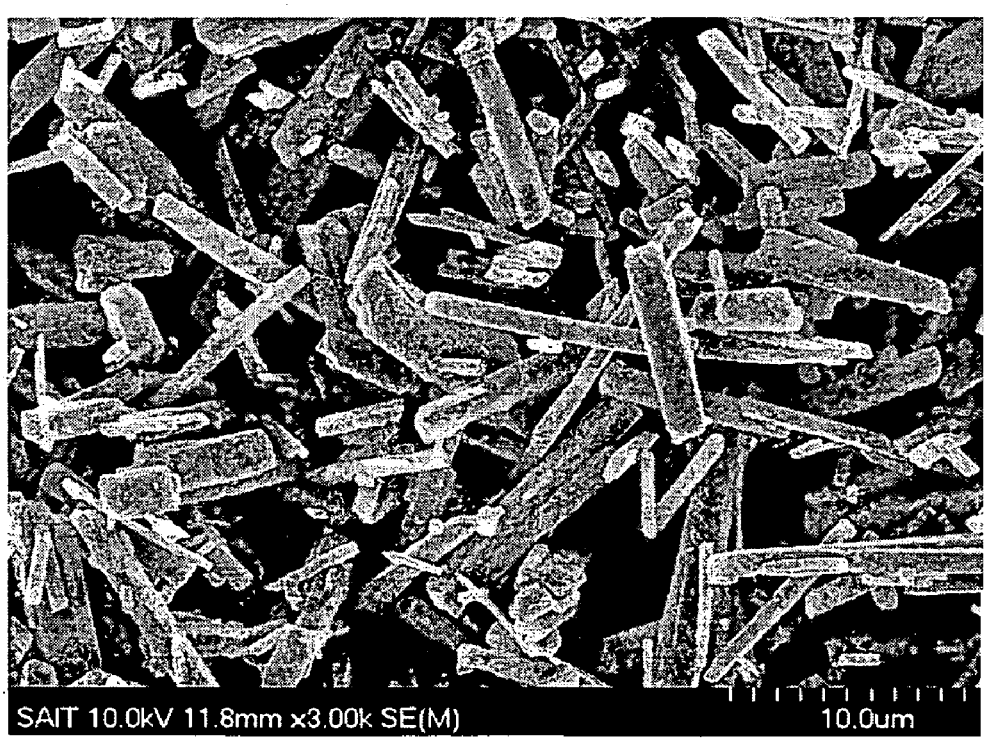
FIG. 3 is an SEM image of the carbon-nickel composite material prepared in Example 1.

SEM images of the untreated crystalline coordination polymer and the carbon-metal composite material obtained after heat treatment are illustrated in FIGS. 2 and 3. As can be seen from FIGS. 2 and 3, although the density of the carbon-metal composite material was greater after heat treatment than before heat treatment due to a reduction in volume, the original crystalline structure was maintained. Thus, the carbon-metal composite material had a regular shape.

Example 2

3.8 g of nickel (II) acetate tetrahydrate and 2.0 g of trimesic acid were added to 100 mL of distilled water and stirred at room temperature for 2 hours. Powders produced in the solution were separated using a nylon filter, washed with distilled water several times, and then dried in an oven at 100° C. for 2 hours to obtain a crystalline coordination polymer.

The obtained crystalline coordination polymer was subjected to heat treatment under an Ar atmosphere at 900° C. for 1 hour to prepare a carbon-metal composite material which had the same shape as the untreated crystalline coordination polymer and a reduced volume.

Figure 4:
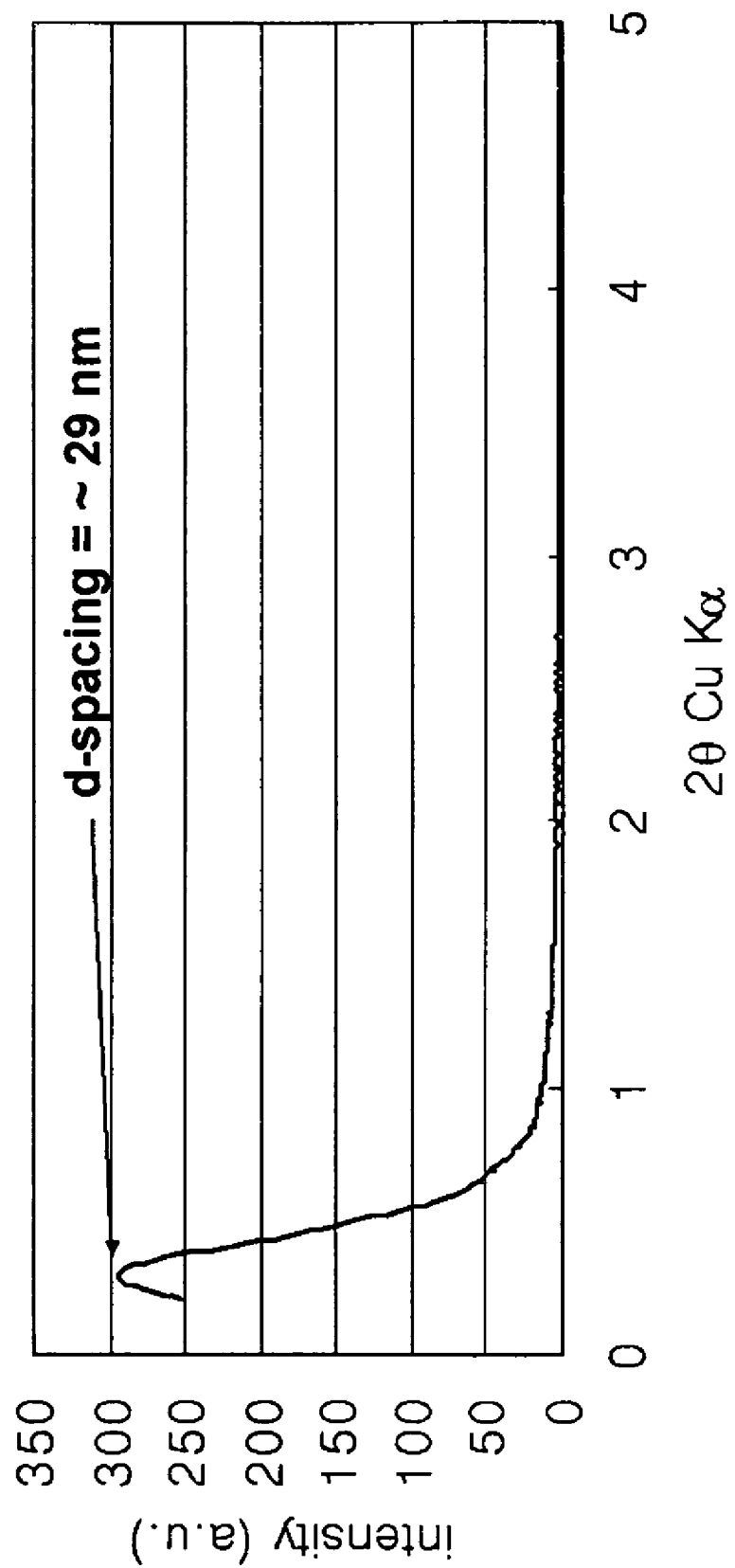
FIG. 4 is a graph illustrating an X-ray diffraction pattern of a carbon-nickel composite material prepared in Example 2 of the invention.

Referring to FIG. 4, a periodicity of 29 nm could be observed when a low angle X-ray diffraction experiment was performed.

Figure 5:
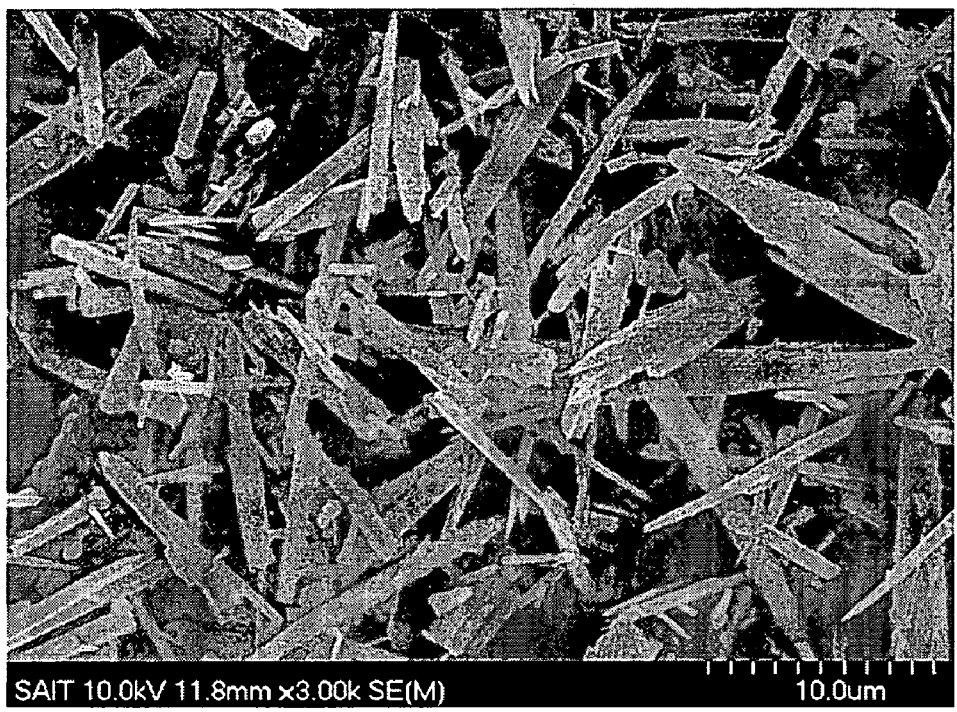
FIG. 5 is an SEM image of a coordination polymer prepared in Example 2.
Figure 6:
FIG. 6 is an SEM image of the carbon-nickel composite material prepared in Example 2.

SEM images of the untreated crystalline coordination polymer and the carbon-metal composite material obtained after heat treatment are illustrated in FIGS. 5 and 6. As can be seen from FIGS. 5 and 6, although the density of the carbon-metal composite material was greater after heat treatment than before heat treatment due to a reduction in volume, the original crystalline structure was maintained. Thus, the carbon-metal composite material had a regular shape.

Example 3

A carbon-nickel composite material was prepared according to Example 1, except that the synthesis temperature of the coordination polymer was changed from 55° C. to 100° C.

Figure 7:
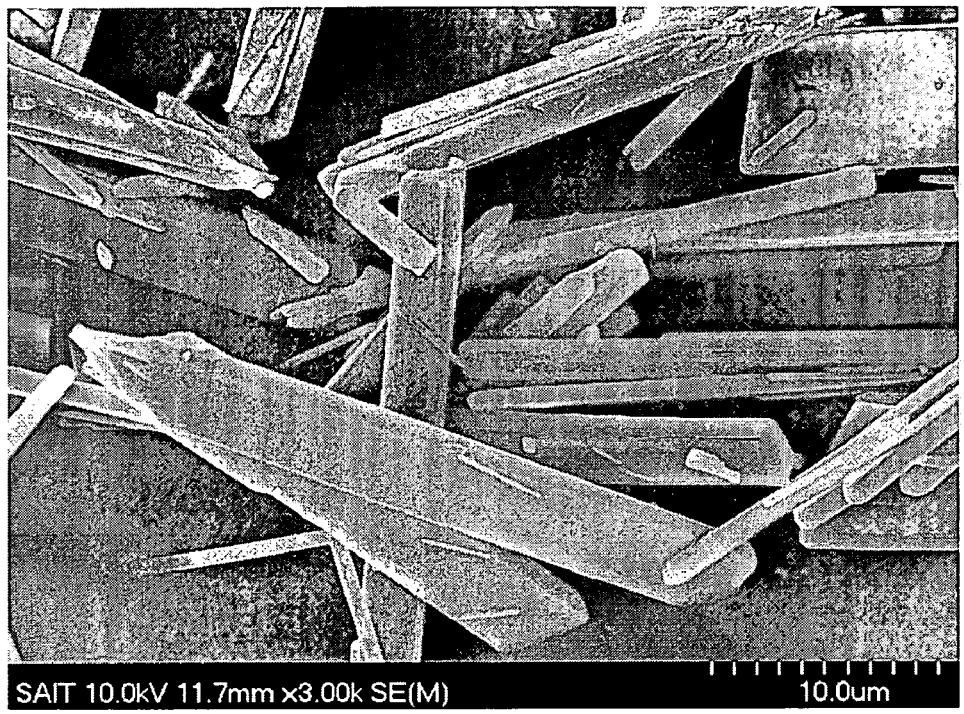
FIG. 7 is an SEM image of a coordination polymer prepared in Example 3 of the invention.
Figure 8:
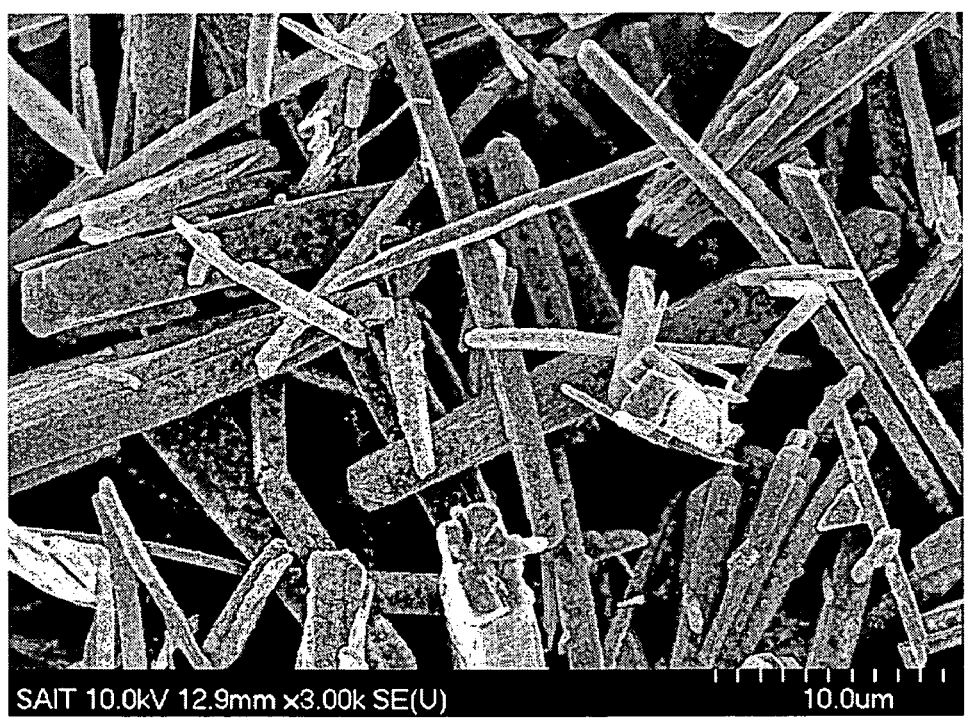
FIG. 8 is an SEM image of the carbon-nickel composite material prepared in Example 3.

SEM images of the untreated crystalline coordination polymer and the carbon-metal composite material obtained after heat treatment are illustrated in FIGS. 7 and 8. As can be seen from FIGS. 7 and 8, although the density of the carbon-metal composite material was greater after heat treatment than before heat treatment due to a reduction in volume, the original crystalline structure was maintained, indicating that the carbon-metal composite material had a regular shape.

Example 4

A desired carbon-metal composite material was prepared according to Example 1, except that the heating temperature was 600° C. A periodicity of 6.3 nm could be observed when a low angle X-ray diffraction experiment was performed.

Example 5

A desired carbon-metal composite material was prepared according to Example 1, except that the heating temperature was 700° C. A periodicity of 13 nm could be observed when a low angle X-ray diffraction experiment was performed.

Example 6

A desired carbon-metal composite material was prepared according to Example 1, except that the heating temperature was 800° C. A periodicity of 17 nm could be observed when a low angle X-ray diffraction experiment was performed.

Example 7

4.89 g of terephthalic acid and 2.36 g of 50 wt % NaOH aqueous solution were dispersed in 250 ml of deionized water. The dispersion was slowly heated until the boiling point was reached, and 250 ml of an aqueous $AgNO_3$ solution ($AgNO_3$ 10.0 g) was added thereto. It was observed with the naked eye that white particles were formed as soon as the $AgNO_3$ solution was added. The solution was heated and stirred for 20 minutes to maintain the boiling state. The resulting powder in the solution was separated using a nylon filter and washed several times with distilled water, and then dried in an oven at 80° C. overnight to obtain crystalline silver (I) terephthalate including a coordination polymer as white powder.

Figure 18:
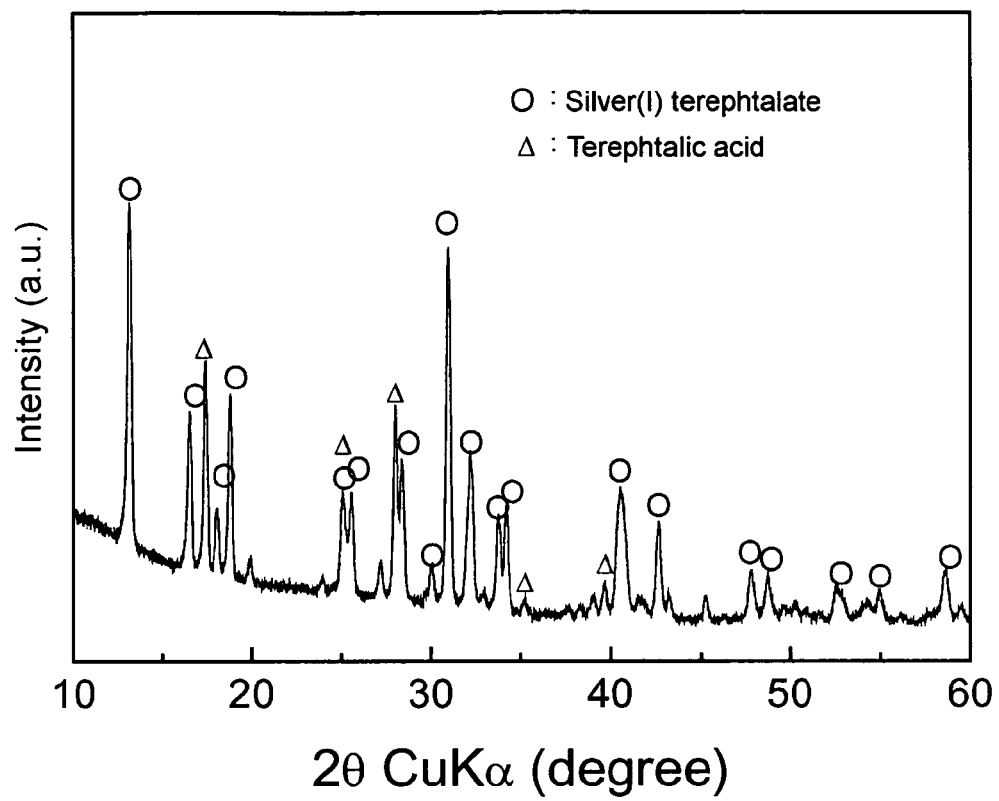
FIG. 18 is a graph illustrating a X-ray diffraction pattern of a coordination polymer prepared in Example 7.
Figure 19:
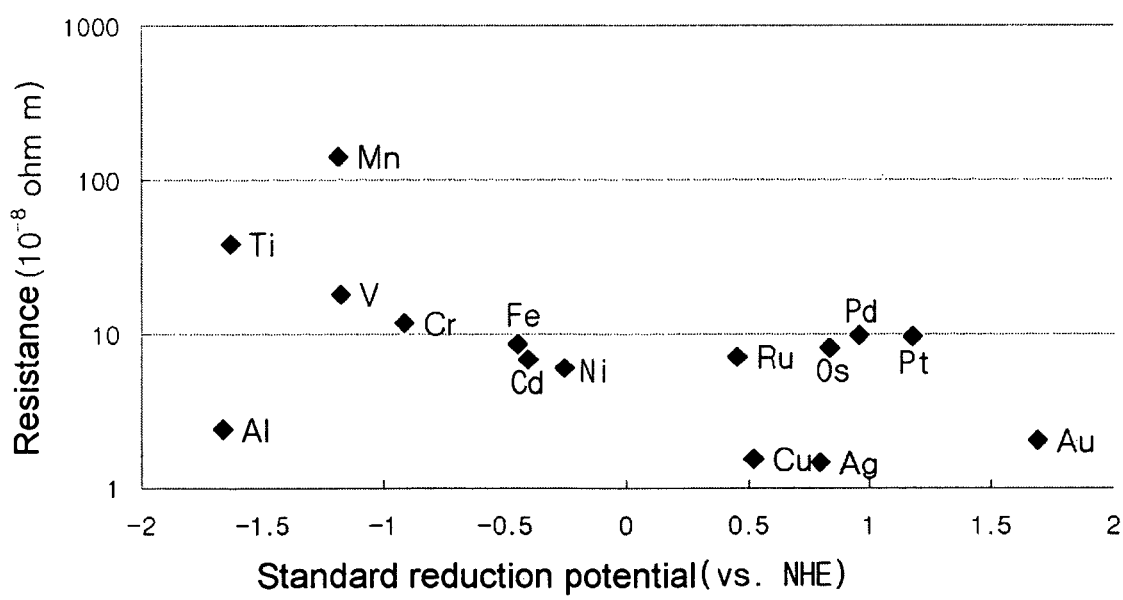
FIG. 19 is a diagram illustrating standard reduction potentials of various metals.

FIG. 18 illustrates an x-ray diffraction pattern of the white powder. It can be seen from FIG. 18 that the coordination polymer was synthesized.

The powder including the crystalline silver (I) terephthalate was subjected to heat treatment at 800° C. for 1 hour under an argon atmosphere to prepare a carbon-silver composite material, which had the same shape as but less volume than the untreated crystalline coordination polymer.

Figure 9:
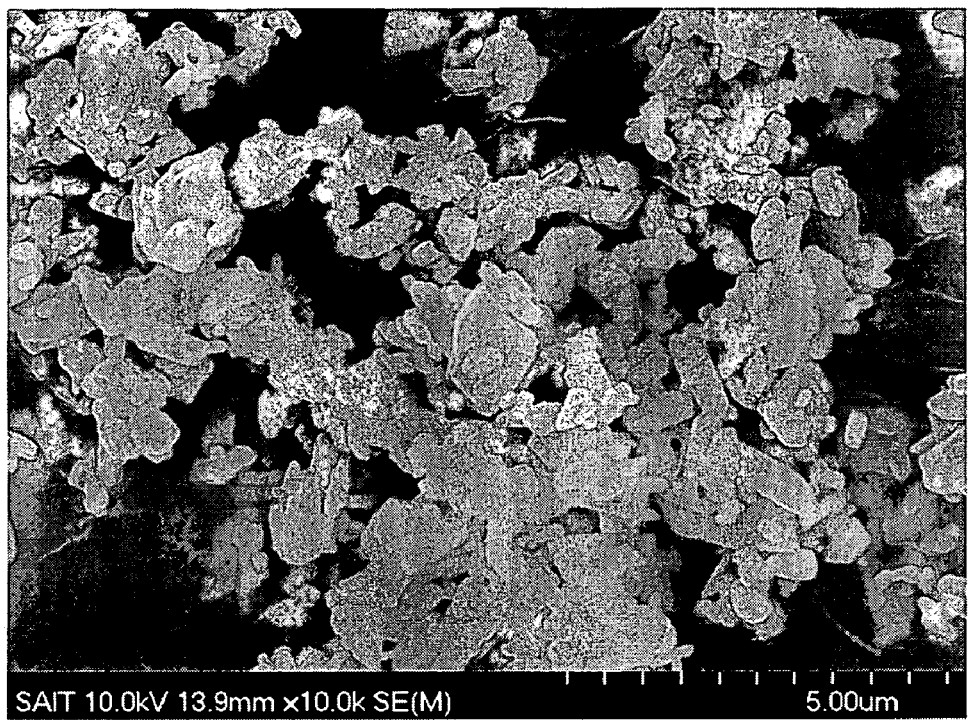
FIG. 9 is an SEM image (X 10.0 k) of a coordination polymer prepared in Example 7.
Figure 10:
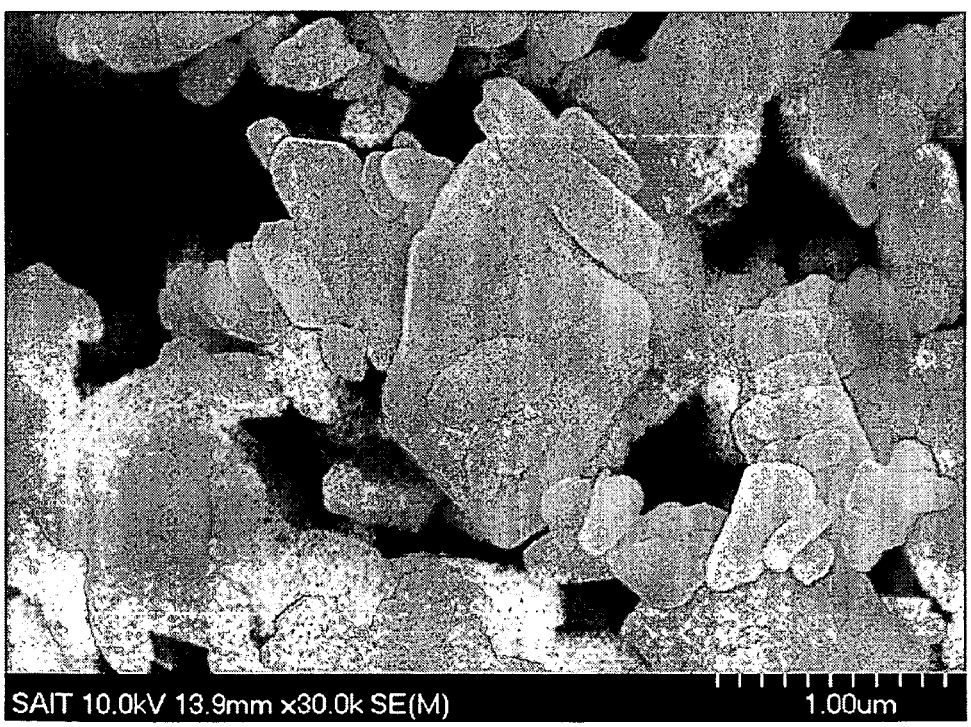
FIG. 10 is a magnified SEM image (X 30.0 k) of a coordination polymer prepared in Example 7.
Figure 11:
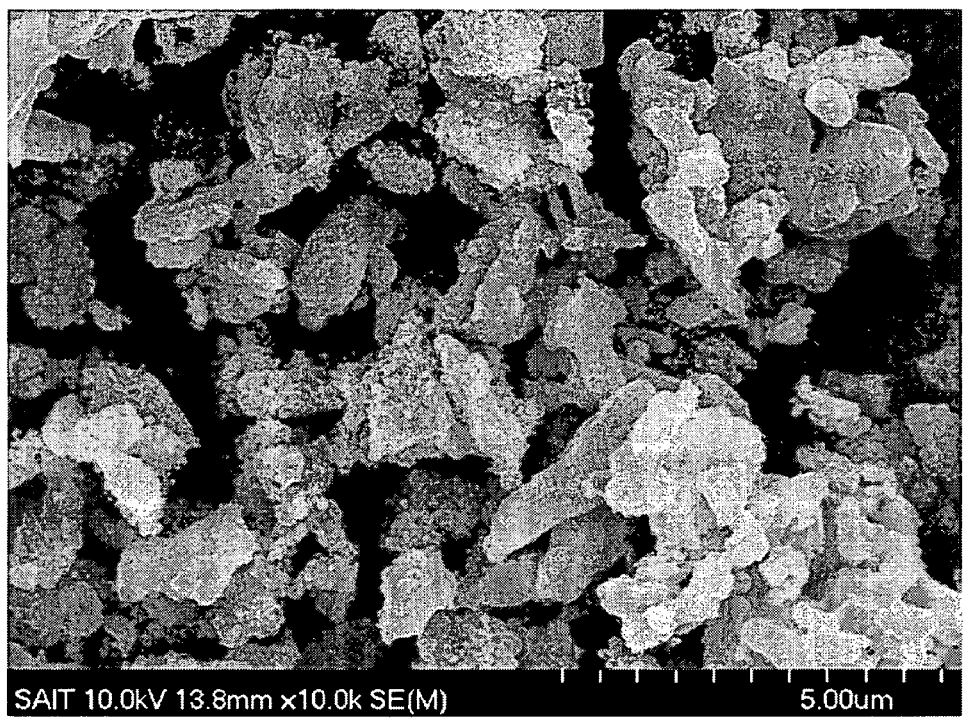
FIG. 11 is an SEM image (X 10.0 k) of a carbon-silver composite material prepared in Example 7.
Figure 12:
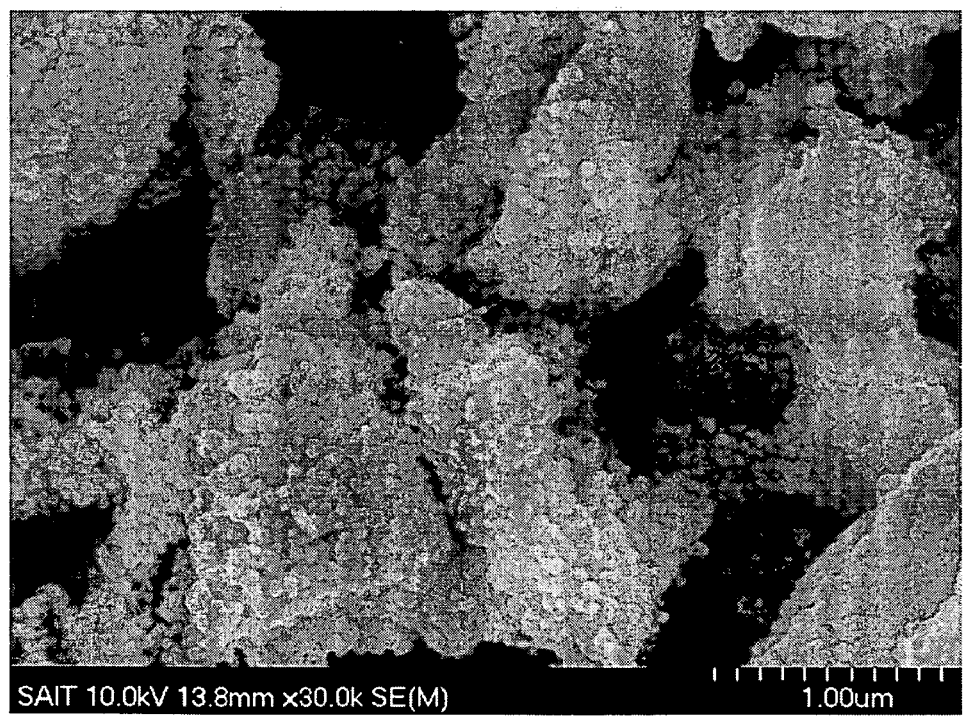
FIG. 12 is a magnified SEM image (X 30.0 k) of a carbon-silver composite material prepared in Example 7.

The carbon-silver composite material was measured using an X-ray diffraction method. As a result, the size of silver metal particles was 22.3 nm. FIGS. 9 through 12 illustrate SEM images of the untreated crystalline coordination polymer and carbon-silver composite materials obtained after heat treatment. In detail, FIG. 9 is an SEM image of untreated crystalline coordination polymer and FIG. 10 is a magnified image of FIG. 9. FIG. 11 is an SEM image of the carbon-silver composite material obtained after heat treatment and FIG. 12 is a magnified image of FIG. 11. As can be seen from FIGS. 9 through 12, although the density of the carbon-silver composite material was greater after heat treatment than before heat treatment due to a reduction in volume, the original crystalline structure was maintained, indicating that the carbon-silver composite material had a regular shape. In addition, it can be seen from FIGS. 10 and 12, which are magnified SEM images, that the surface of the carbon-silver composite material was smooth before heat treatment (FIG. 9), whereas the surface became rough after heat treatment (FIG. 12), indicating that the specific surface area was improved.

Experimental Example 1

Conductivity 0.1 g of each of the carbon-metal composite materials, i.e., carbon-nickel composite materials and carbon-silver composite materials prepared in Examples 1, 2, 3, and 7 were used to prepare disc-shaped pellets having a diameter of 13 mm. The sheet resistance of each pellet was measured by a sheet resistance measurement system (CMT-SR1000, Chang Min Tech) using a 4-probe method under pressures of 100 kg$_f$/cm$^2$ and 200 kg$_f$/cm$^2$. The results obtained are indicated in Table 1.

Disc-shaped pellets having a diameter of 13 mm were prepared individually using 0.1 g of KETJEN BLACK™ (available from Akzo Nobel), which is a carbon material generally used as a support of a catalyst or a conductive additive due to its high conductivity, 0.1 g of SP-270 powder (available from Nippon Carbon), which is known to have very high conductivity due to a high concentration of graphite, and 0.1 g of SFG6 powder (available from Timcal), which is a kind of graphite with a particle size of 6 microns. The sheet resistance of each pellet was measured using a 4-probe method under pressures of 100 kg$_f$/cm$^2$ and 200 kg$_f$/cm$^2$. The results obtained are indicated in Table 1.

As can be seen from the results of Table 1, the carbon-metal composite materials (carbon-nickel composite material and carbon-silver composite material) prepared in Examples 1, 2, 3, and 7 had much lower sheet resistances than the conventional carbon materials, i.e., KETJEN BLACK, SP-270 and SFG6, indicating that the carbon-metal composite materials of the invention have very high conductivity. In particular, the carbon-silver composite material prepared in Example 7 has a sheet resistance below the lower limit of measurement (<1 mΩ/sq.), indicating a remarkable improvement in the electrical conductivity.

Experimental Example 2

Performance as Conducting Agent

The carbon-metal composite material obtained in Example 2 was added as a conducting agent to a silicon-graphite composite cathode and the effect was measured. The obtained results are indicated in Table 2. SFG6 powder (available from Timcal), which is a type of graphite with an average particle size of 6 microns, was used as a comparative material. The capacity ratio as used herein is the ratio of a capacity obtained when a current (1 C) 10 times a standard current (0.1 C) is applied to a capacity obtained when the standard current is applied.

TABLE 2

| Additive | Amount of additive | Capacity ratio (1 C/0.1 C) |
|---|---|---|
| Example 2 | 5% by weight | 97.0% |
| No additive | 0 | 26.8% |
| SFG6 | 20% by weight | 94.0% |

As can be seen from the results of Table 2, the carbon-metal composite material of Example 2 has a capacity ratio of 97.0%, which cannot be achieved by SFG6 even when the amount by weight of the SFG6 is 4 times the carbon-metal composite material. Thus, it is apparent that the carbon-metal composite material of the invention is useful as a conducting agent.

Experimental Example 3

Specific Surface Area

The specific surface area of the carbon-silver composite material obtained in Example 7 was measured by specific surface area measurement equipment from Micromeritics (Norcross, Ga., USA) using a BET method. As a result, the specific surface area was 93.8 m$^2$/g (C—Ag composite material). When the obtained value was converted into only carbon mass, the specific surface area was 440 m$^2$/g (C). These results indicate that the carbon-metal composite material of the invention has remarkably improved specific surface area.

TABLE 1

| | Pressure | Example 1 | Example 2 | Example 3 | Example 7 | KETJEN BLACK | SP-270 | SFG6 |
|---|---|---|---|---|---|---|---|---|
| Sheet resistance (mΩ/sq.) | 100 kg$_f$/cm$^2$ | 5.1 | 2.7 | 2.1 | <1 | 12.7 | 8.1 | 11.6 |
| | 200 kg$_f$/cm$^2$ | 2.4 | 1.7 | 1.5 | <1 | 9.0 | 7.5 | 4.3 |

Thus, the carbon-metal composite material of the invention is very useful as a support for a catalyst in fuel cells.

Experimental Example 4

Average Particle Diameter

Particle diameters of 40 particles which were randomly selected from SEM images of the carbon-silver composite material prepared in Example 7 (FIGS. 9 through 12) were measured with the naked eye. As a result, the average particle diameter was about 0.75 μm, indicating that nano-sized particles were observed.

Experimental Example 5

TEM Analysis of Carbon-Nickel Composite Material

Figure 13:
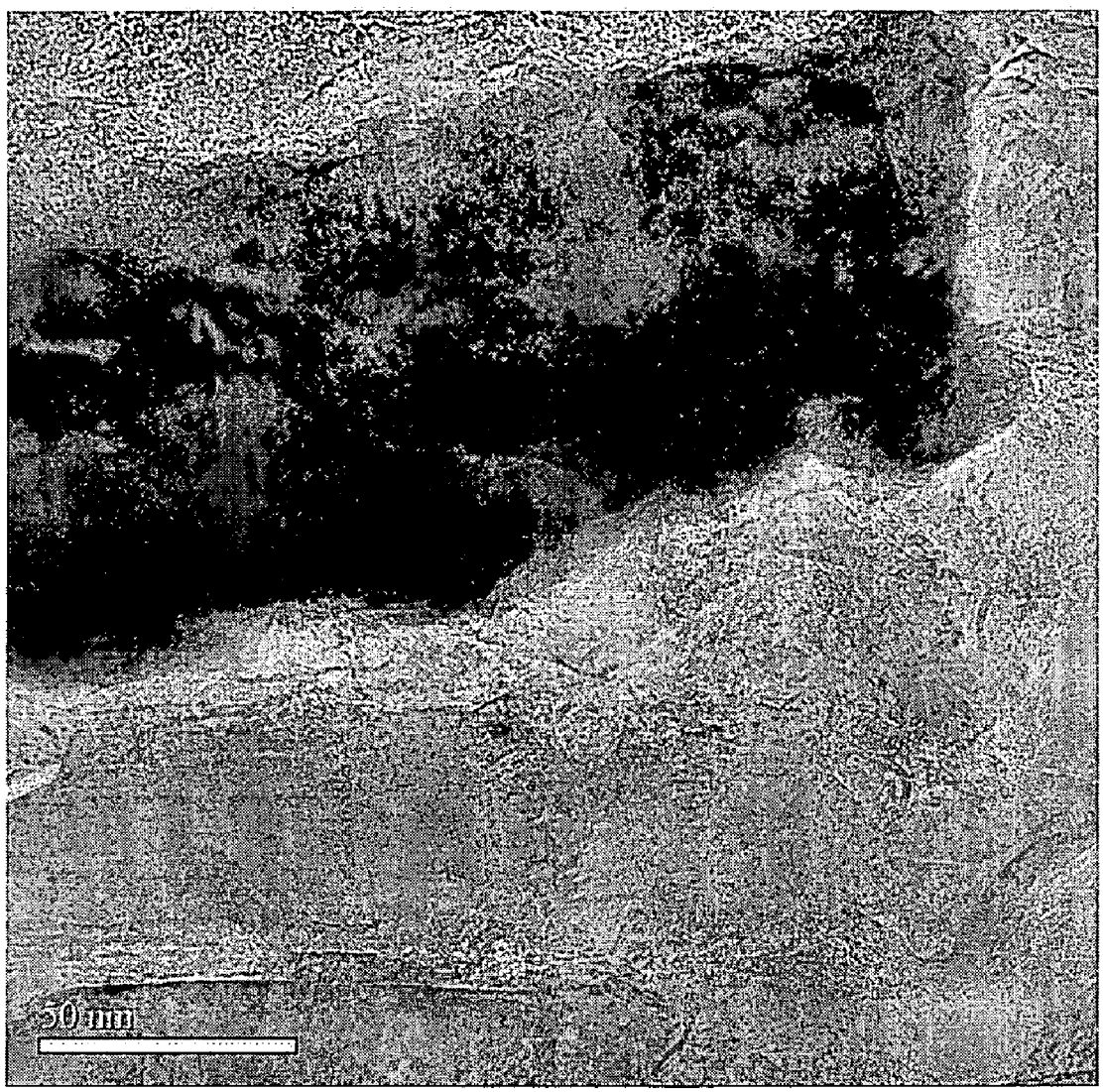
FIG. 13 is a TEM image of the carbon-nickel composite material prepared in Example 1.

FIGS. 13 and 14 are TEM images of the carbon-nickel composite material prepared in Example 1. It can be seen from FIG. 13 that some of nickel particles are in rod form and some of carbon particles are in the form of nanotubes or nanofibers. FIG. 14 is a magnified image of FIG. 13 and shows that graphitic carbon is distributed around nickel particles and carbon is in the form of nanotubes or nanofibers.

Experimental Example 6

X-Ray Diffraction Analysis at a General Angle

Figure 15:
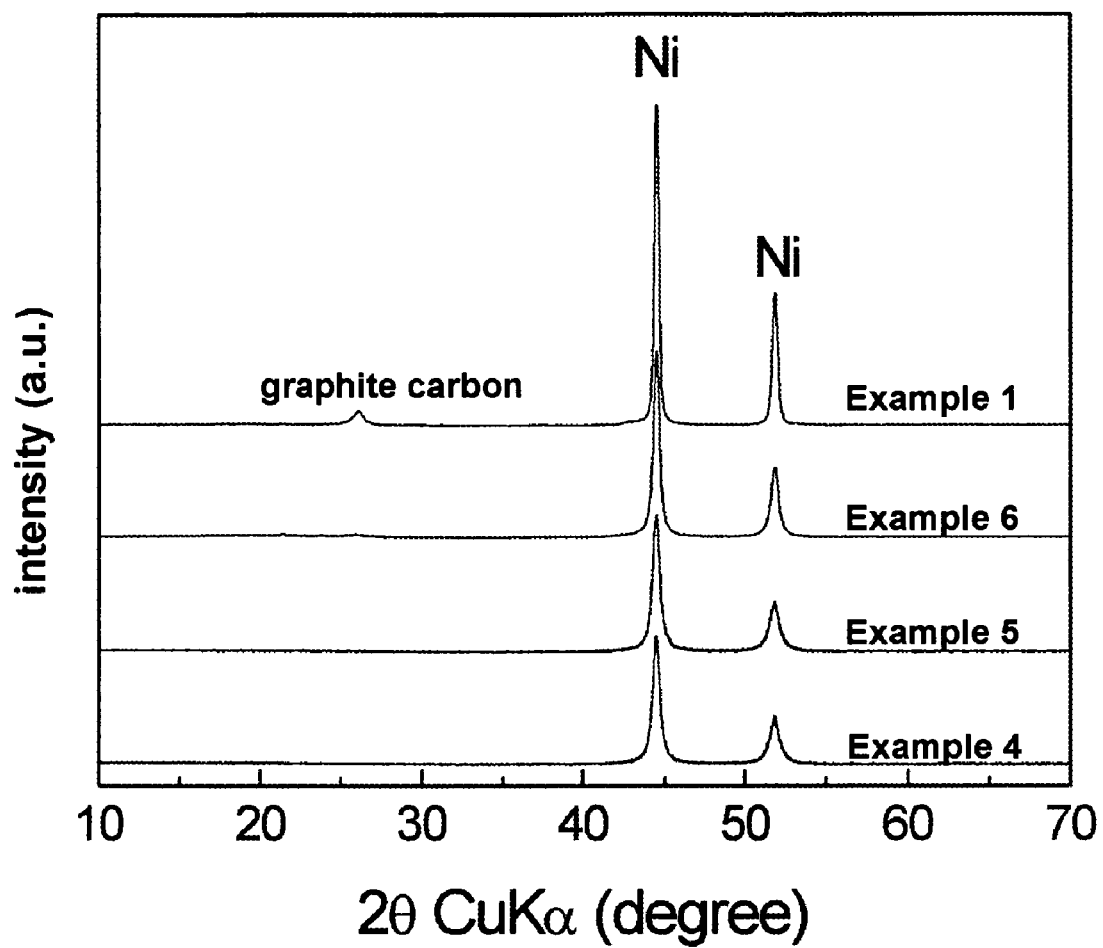
FIG. 15 is a graph illustrating X-ray diffraction patterns of Examples 1, 4, 5, and 6.

X-ray diffraction analysis at a general angle was performed on carbon-nickel composite materials prepared in Examples 1, 4, 5, and 6 and the results are illustrated in FIG. 15. It can be seen from FIG. 15 that the carbon-nickel composite materials consist of nickel and carbon, and graphitic carbon is produced when a composite material is formed using a heat treatment temperature of 800° C. or higher.

Experimental Example 7

Thermogravimetric Analysis (TGA)

Figure 16:
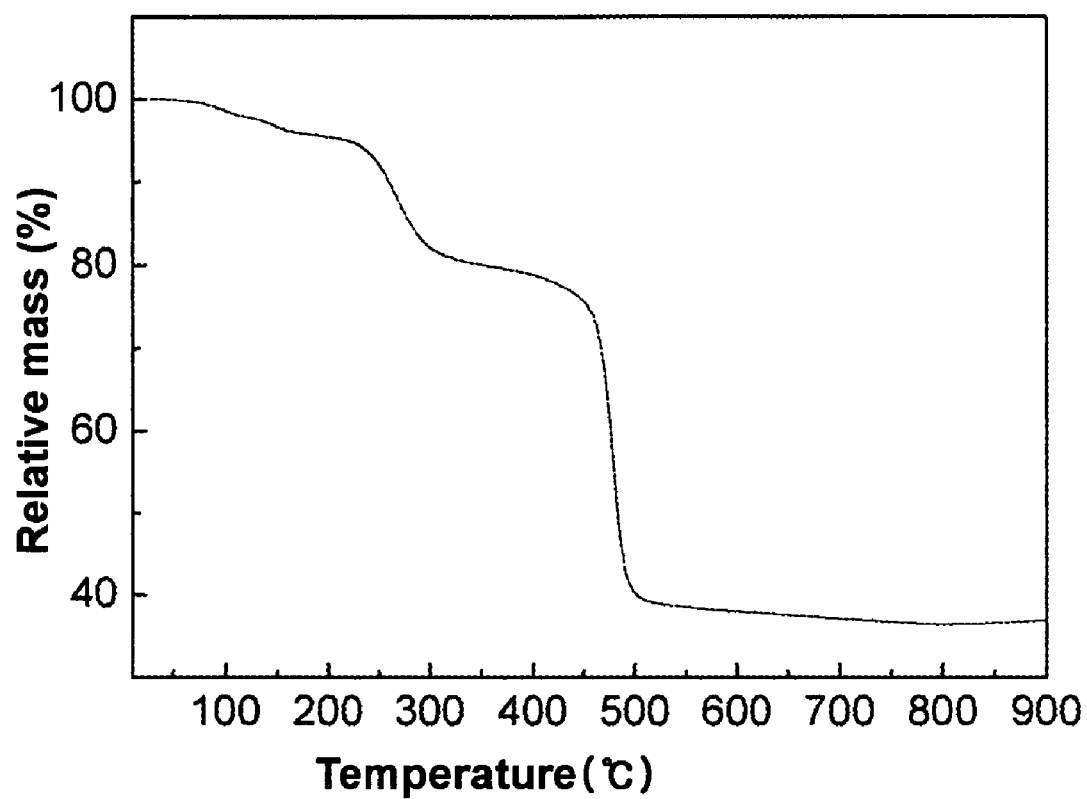
FIG. 16 is a graph illustrating the thermogravimetric analysis results of a coordination polymer prepared in Example 1.

TGA was performed by heating the coordination polymer prepared in Example 1 under nitrogen atmosphere at a rate of 10° C./min and the results are illustrated in FIG. 16. It can be seen from FIG. 16 that water is removed up to approximately 350° C., pyrolysis occurs at 400-500° C., and the carbon-nickel composite material is formed at 500° C. or higher.

Figure 17:
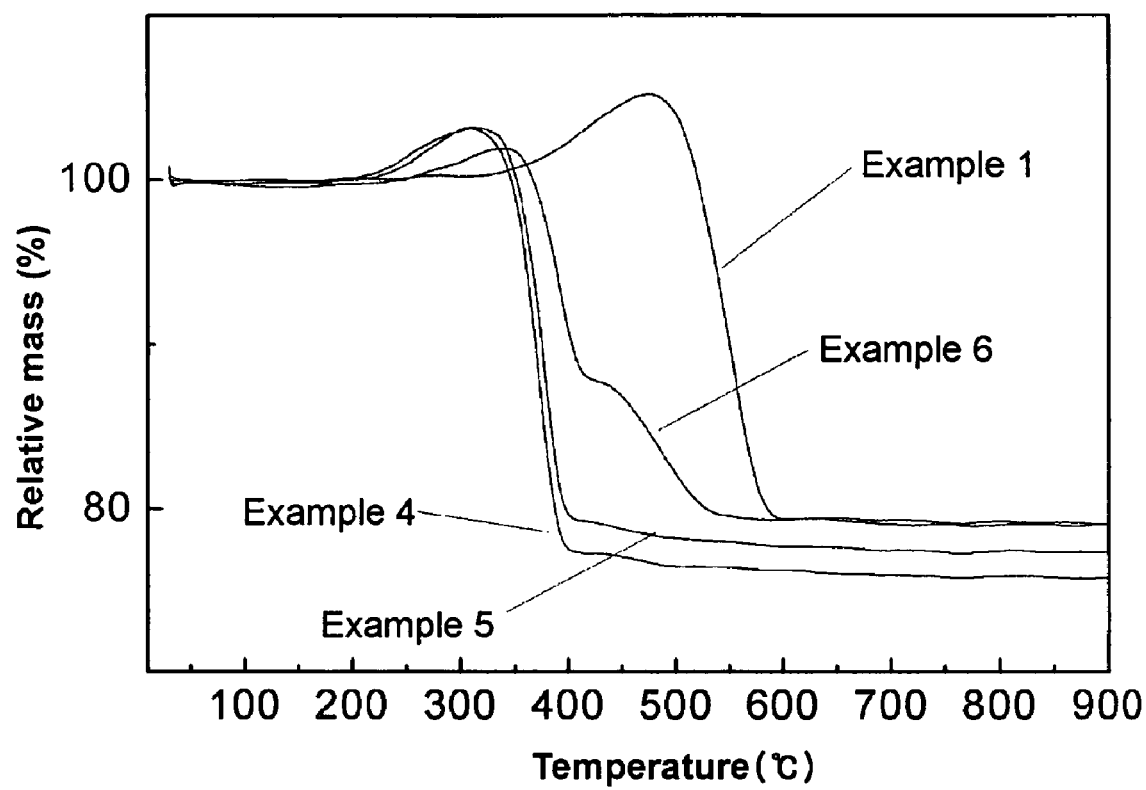
FIG. 17 is a graph illustrating the thermogravimetric analysis results of carbon-nickel composite materials prepared in Examples 1, 4, 5, and 6.

Similarly, TGA for the carbon-nickel composite material prepared in Examples 1, 4, 5, and 6 was performed under air atmosphere at a heating rate of 10° C./min and the results are illustrated in FIG. 17. It appears that the increase in mass observed in the middle portion of the curve results from oxidation of nickel into nickel oxide. In the case of the composite materials prepared in Examples 4 and 5 using a heat treatment process at 600° C. and 700° C., respectively, carbon is removed at 400° C. or lower, indicating that most of carbon included in the carbon-nickel composite material is amorphous carbon. In the case of the composite material prepared in Example 6 using a heat treatment process at 800° C., part of the carbon is removed at 400° C. or lower and remaining carbon is removed at temperatures higher than 400° C., which indicates that carbon included in the carbon-nickel composite material is a mixture of amorphous carbon and graphitic carbon. In the case of the composite material prepared in Example 1 using a heat treatment process at 900° C., most of the carbon is removed at temperatures higher than 500° C., indicating that most of the carbon included in the carbon-nickel composite material is graphitic carbon.

The carbon-metal composite material according to an embodiment of the invention obtained by performing a heat treatment on the coordination polymer has an easily-controlled shape and has a very regular and compact particle structure, and thus has very high conductivity and improved specific surface area. Thus, the carbon-metal composite material can be used as an active material for cells, catalysts, support for catalysts, hydrogen reservoirs, conducting agents, magnetic substances, luminescent substances, nonlinear optical materials, etc.

While the invention has been shown and described with reference to exemplary embodiments thereof, it will be understood by those of ordinary skill in the art that various changes in form and details may be made therein without departing from the spirit and scope of the invention as defined by the following claims.

What is claimed is:

1. A carbon-metal composite material prepared by performing a heat treatment on a powder including a coordination polymer,
wherein the carbon-metal composite has a sheet resistance of 8 mΩ/sq or less under a pressure of 100 kg/cm², and
wherein the coordination polymer is a compound of formula (1):

$$M_x L_y S_z \tag{1}$$

where M is a metal selected from the group consisting of transition metals, group 13, group 14, group 15, lanthanides, actinides, and combinations thereof;
L is a multi-dentate ligand simultaneously forming an ionic bond or a covalent bond with at least two metal ions;
S is a monodentate ligand forming an ionic bond or a covalent bond with one metal ion; and
the number of functional groups of L that can bind to the metal (M) ion is d, and x, y, and z are integers satisfying $yd+z \leqq 6x$, $x \geqq 1$, $y \geqq 1$, and $y+z \geqq 1$.

2. The carbon-metal composite material of claim 1, wherein the sheet resistance is in the range of 0.01-5 mΩ/sq.

3. The carbon-metal composite material of claim 1, having a specific surface area of 30 m²/g or greater.

4. The carbon-metal composite material of claim 1, wherein the specific surface area is in the range of 50-500 m²/g.

5. The carbon-metal composite material of claim 1, having an X-ray diffraction pattern with a d-spacing of 6 nm or greater.

6. The carbon-metal composite material of claim 1, having an X-ray diffraction pattern with a d-spacing of 10-100 nm.

7. The carbon-metal composite material of claim 1, having an average particle diameter of 1 μm or less.

8. The carbon-metal composite material of claim 1, having an average particle diameter of 0.01-1 μm.

9. The carbon-metal composite material of claim 1, wherein the metal is selected from the group consisting of Fe, Pt, Co, Cd, Cu, Ti, V, Cr, Mn, Ni, Ag, Au, Pd, Ru, Os, Mo, Zr, Nb, La, In, Sn, Pb, Bi, and combinations thereof.

10. The carbon-metal composite material of claim 1, wherein the metal is selected from the group consisting of Ag, Cu, Au, Pt, Pd, Ru, Os, and combinations thereof.

11. The carbon-metal composite material of claim 1, used as an active material for cells, catalysts, support for catalysts, hydrogen reservoirs, conducting agents, magnetic substances, luminous substances, or nonlinear optical materials.

12. A process of preparing a carbon-metal composite material, comprising performing a heat treatment on a powder including a coordination polymer, wherein the coordination polymer is a compound of formula (1):

$$M_xL_yS_z \quad (1)$$

where M is a metal selected from the group consisting of transition metals, group 13, group 14, group 15, lanthanides, actinides, and combinations thereof;

L is a multi-dentate ligand simultaneously forming an ionic bond or a covalent bond with at least two metal ions;

S is a monodentate ligand forming an ionic bond or a covalent bond with one metal ion; and when the number of functional groups of L that can bind to the metal (M) ion is d, and x, y, and z are integers satisfying $yd+z \leqq 6x$, $x \geqq 1$, $y \geqq 1$, and $y+z \geqq 1$.

13. The process of claim 12, wherein the powder including a coordination polymer is obtained by separating solids from a solution of coordination polymers formed by coordinating multi-dentate ligands, monodentate ligands, or multi-dentate ligands and monodentate ligands to metal and drying the solids.

14. The process of claim 12, wherein the heat treatment temperature is between 600° C. and a melting point of a core metal contained in the coordination polymer.

15. The process of claim 12, wherein the coordination polymer forms a network structure by linking metals by means of the multi-dentate ligand.

16. The process of claim 12, wherein the multi-dentate ligand is a ligand selected from the group consisting of trimesate-based ligands of formula (4), terephthalate-based ligands of formula (5), 4,4'-bipyridine-based ligands of formula (6), 2,6-naphthalenedicarboxylate-based ligands of formula (7), pyrazine-based ligands of formula (8), and combinations thereof:

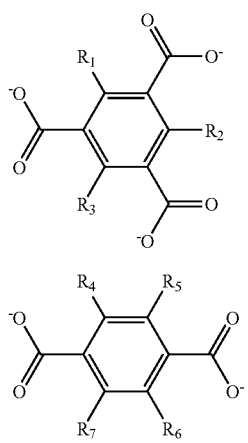

(4)

(5)

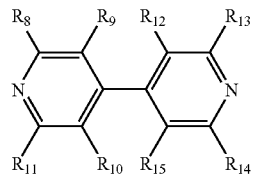

(6)

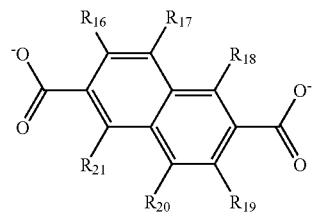

(7)

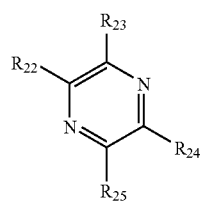

(8)

where $R_1$ to $R_{25}$ are each independently a hydrogen atom, a halogen atom, a hydroxy group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{6-30}$ aryl group, a substituted or unsubstituted $C_{6-30}$ aryloxy group, a substituted or unsubstituted $C_{2-30}$ heteroaryl group or a substituted or unsubstituted $C_{2-30}$ heteroaryloxy group.

17. The process of claim 12, wherein the metal is selected from the group consisting of Fe, Pt, Co, Cd, Cu, Ti, V, Cr, Mn, Ni, Ag, Au, Pd, Ru, Os, Mo, Zr, Nb, La, In, Sn, Pb, Bi, and combinations thereof.

18. A catalyst comprising the carbon-metal composite material of claim 1.

19. The catalyst of claim 18, wherein the carbon-metal composite material is a support.

20. A fuel cell comprising the catalyst of claim 18.

21. The carbon-metal composite material of claim 1, wherein the carbon-metal composite material comprises repeating structures.

* * * * *